United States Patent [19]

Wilshusen

[11] Patent Number: 5,269,714
[45] Date of Patent: Dec. 14, 1993

[54] AUGER BOAT

[76] Inventor: Albert R. Wilshusen, P.O. Box 2225, Hutchinson, Kans. 67504-2225

[21] Appl. No.: 919,244

[22] Filed: Jul. 27, 1992

[51] Int. Cl.⁵ .............................................. B63H 1/26
[52] U.S. Cl. .................................... 440/48; 114/270
[58] Field of Search .......................... 114/270; 440/48

[56] References Cited

U.S. PATENT DOCUMENTS

| | | | |
|---|---|---|---|
| 568,604 | 9/1986 | Duerr | 440/48 |
| 1,289,808 | 12/1918 | Kennedy et al. | 114/270 |
| 3,906,888 | 9/1975 | Justinien | 440/48 |
| 4,734,067 | 3/1988 | Elias-Reyes | 440/48 |

Primary Examiner—Jesus D. Sotelo

[57] ABSTRACT

A boat with a pair of air hose augers with a rubber ridge type surface and two wheels of a ridge surface or sled runners for holding a boat on the rails of a railroad track, the boat has a double snow plow blade for cleaning away the snow from streets, railroad tracks, etc., the air hose auger of six inches would handle a small boat easily.

2 Claims, 2 Drawing Sheets

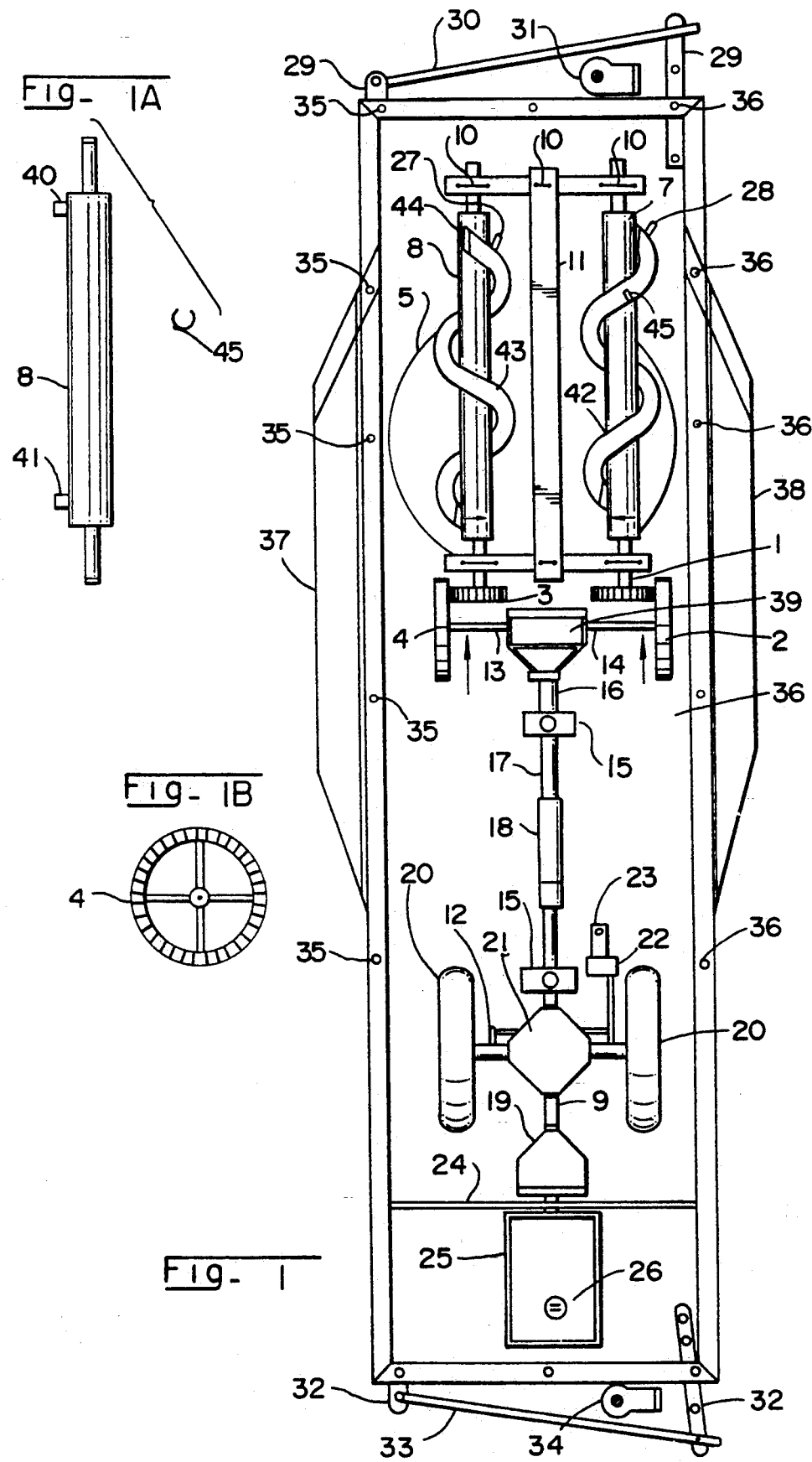

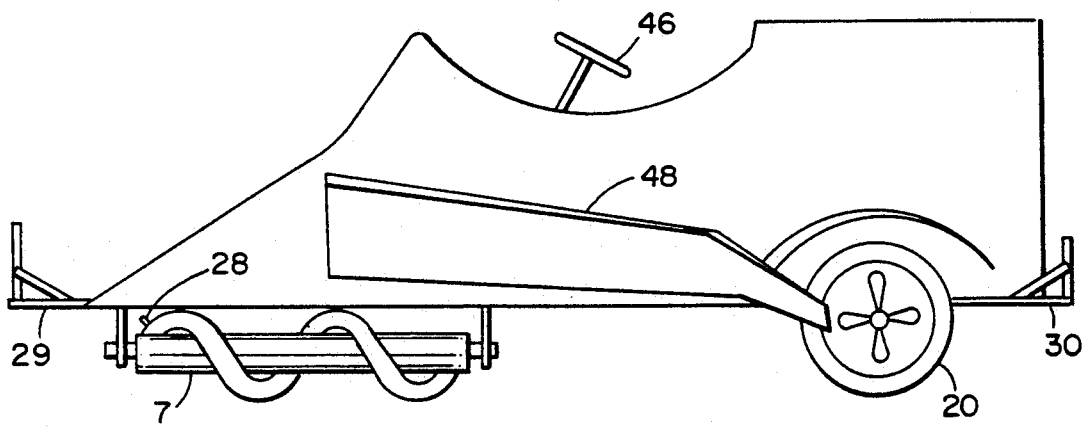
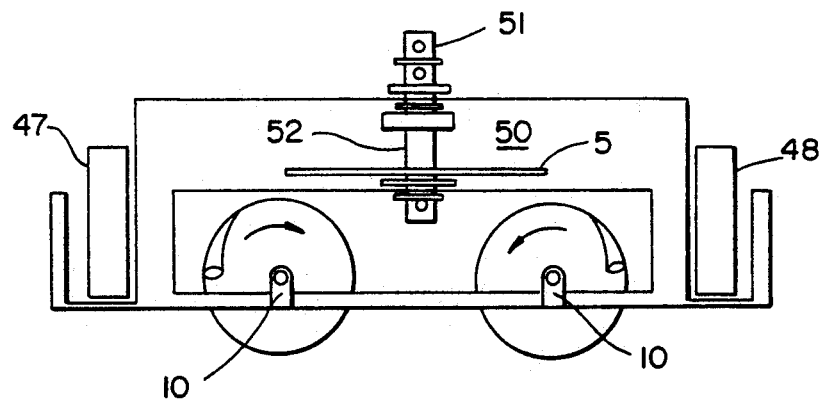

AUGER BOAT

The present invention generally relates to a boat and more particularly a boat which is propelled by a pair of rubber air hoses and a pair of propeller wheels and the boat can travel on land or water.

An object of the invention is providing additional energy with a duct tube which will force a stream of water on the propeller wheels and a blast of air when on land travel.

Another object of the invention it could get on and off a railroad track of its own power as it has a steering device for the front augers and another steering device for propeller wheels to direct its course easily.

FIG. 1 is an upright bottom view of a portion of a boat with the propelling parts incorporated therein;

FIG. 1A shows a roller;

FIG. 1B shows a cogwheel;

FIG. 2 is a side view of a boat with a duct tube;

FIG. 3 is a front end view of a boat with a fifth wheel with a steer wheel coupling.

Referring now specifically to the drawings, the numeral 6 generally designates the frame of the boat for its structure, cogwheel 1 is for roller 7, cogwheel 3 is for roller 8, cogwheel 2 is on axle 14, cogwheel 4 is on axle 13 of differential gearing 39, a 5th wheel does the turning of the boat by turning the rubber hose auger rack 11, a tierod 12 is for turning wheels 20, differential gearing 21 is for drive shaft 16, a pair of drive shaft joints 15, a square shaft 17 is for turning the boat by sliding in sleeve 18, transmission 19 is for engine 25 and 26 is the oil drain plug, 24 is the compartment for the engine, air valves are 27 and 28, snow plow hitch 29, snow plow blade is 30, blower fan is 31, rear snow plow hitch 32, snow plow blade 33, blower fan 34, bolt holes and propeller parts are 35 and 36, running boards are 37 and 38, 39 is a differential gears for the air hose augers.

A space for a additional transmission of two speeds having a forward speed and a reverse speed 9 FIG. 1, the rollers and rack are supported by U bolts 10, the hose plug and coupling are 40 and 41, a rubber hose wrapped around roller 7 is anticlockwise and roller turns anticlockwise to obtain its power 42, hose 43 is wrapped around roller 8 clockwise and turns clockwise for its power, the hose clamps are 44, the band clamps 45 are fastened to the rollers and will hold a hose in its place, when the hose is inflated with air, a pair of propeller wheels 20 FIG. 2 and a pair of duct tubes 47 and 48 will give the propeller wheels a stream of water when on a lake and a blast of air when traveling on land, the steer wheel is 46 and the steer wheel coupling is 51, steering gears 50 and axle 52, a fifth wheel 5 will do the turning of the boat with the augers 7 and 8, the support frame 49 is for auger rack 11 FIG. 3.

The foregoing is considered illustrative only of the principles of the invention; further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A boat, comprising:

a frame defining an engine compartment;

an engine mounted within said compartment;

a rack rotatably positioned within said frame;

first and second rollers rotatably mounted on said rack;

a first hose spirally wrapped around said first roller in a first direction;

a second hose spirally wrapped around said second roller in a second direction;

means in operative relationship with said rollers and with said hoses for holding said hoses on said rollers;

a rist air valve in operative relationship with said first hose for enabling air inflation of said first hose;

a second air valve in operative relationship with said second hose for enabling air inflation of said second hose;

means in operative relationship with said engine and with said rollers for rotating said rollers; and means in operative relationship with said rack for enabling turning of said rack, said rollers and said hoses to steer the boat.

2. A boat as in claim 1 further including:

first and second wheels positioned within said frame;

means in operative relationship within said engine and with said wheels for enabling said engine to drive said wheels; and first and second duct tubes in operative relationship with said wheels for directing a stream of fluid against said wheels.

* * * * *